United States Patent [19]

Kanbe et al.

[11] Patent Number: 4,986,441

[45] Date of Patent: Jan. 22, 1991

[54] VENDING MACHINE USING ONE TAKEOUT PORTION FOR A CONVEYOR RACK AND A SERPENTINE RACK

[75] Inventors: Toru Kanbe, Ota; Masayuki Taguchi, Isesaki; Katsunobu Sato, Isesaki, all of Japan

[73] Assignee: Sanden Corporation, Gunma, Japan

[21] Appl. No.: 324,101

[22] Filed: Mar. 16, 1989

[30] Foreign Application Priority Data

Mar. 16, 1988 [JP] Japan ............................ 63-33641[U]

[51] Int. Cl.$^5$ ....................... G07F 11/00; B65G 59/00

[52] U.S. Cl. .................................... 221/130; 221/133; 221/131; 221/192

[58] Field of Search ................. 221/85, 130, 129, 131, 221/150 R, 192, 194, 195, 196, 191, 133, 253, 225; 271/85

[56] References Cited

U.S. PATENT DOCUMENTS

| | | | |
|---|---|---|---|
| 2,496,304 | 5/1944 | Muffly | 221/192 |
| 2,959,412 | 5/1957 | Sjostrom | 271/85 |
| 3,193,135 | 7/1965 | Bentzman | 221/6 |
| 3,193,138 | 6/1965 | Cox et al. | 221/129 |
| 3,276,624 | 10/1966 | Payne | 221/125 |
| 3,498,497 | 3/1970 | Baxendale et al. | 221/116 |
| 3,556,284 | 1/1971 | Dyer et al. | 198/138 |
| 3,770,105 | 11/1973 | O'Neal | 198/138 |
| 3,795,345 | 3/1974 | Baxendale | 221/125 |
| 3,810,561 | 5/1974 | Merkl | 221/253 |
| 4,108,333 | 8/1978 | Falk et al. | 221/130 |
| 4,561,564 | 12/1985 | Negishi | 221/64 |
| 4,591,069 | 5/1986 | Stewart | 221/6 |
| 4,632,257 | 12/1986 | Negishi et al. | 211/59.2 |
| 4,685,590 | 8/1987 | Negishi et al. | 221/241 |
| 4,687,119 | 8/1987 | Juillet | 221/101 |
| 4,730,750 | 3/1988 | Ficken | 221/124 |

FOREIGN PATENT DOCUMENTS

| | | |
|---|---|---|
| 1171658 | 6/1964 | Fed. Rep. of Germany . |
| 62-14579 | 1/1987 | Japan . |
| 152020 | 7/1986 | United Kingdom . |

*Primary Examiner*—H. Grant Skaggs
*Attorney, Agent, or Firm*—Banner, Birch, McKie & Beckett

[57] ABSTRACT

A vending machine includes a cabinet, a first merchandise carrying member disposed within said cabinet having a plurality of vertically aligned conveyor racks and a vertically extending elevator disposed within the cabinet. The elevator has a movable bucket. The machine also includes a second merchandise carrying member disposed within the cabinet, disposed under the plurality of conveyor racks and including at least one serpentine rack. A conveyor mechanism is disposed under the at least one serpentine rack for receiving merchandise from the at least one serpentine rack and for carrying this same merchandise to the bucket of the elevator.

20 Claims, 4 Drawing Sheets

VENDING MACHINE USING ONE TAKEOUT PORTION FOR A CONVEYOR RACK AND A SERPENTINE RACK

BACKGROUND OF THE INVENTION

1. Field of the Invention

This invention relates to a vending machine, and, more particularly, to a vending machine having both a conveyor rack and a serpentine rack which uses only one cabinet takeout portion for removing merchandise from each of these type racks.

2. Description of the Prior Art

A conventional vending machine is shown in FIG. 1 and is disclosed in Japanese Utility Model Laid-Open Gazette No. 62-14579. Vending machine 1 has first merchandise carrying mechanisms 6 which each include a plurality of conveyor racks 2 and an elevator 3. The vending machine also has second merchandise carrying mechanisms 9 which each include a serpentine rack 7. These serpentine racks are disposed under respective conveyor racks 2. Merchandise which is disposed on the conveyor rack 2 is carried to a bucket 4 of the elevator 3 and then carried to takeout portion 5 by the bucket of the elevator. Likewise, merchandise in a serpentine rack 7 is carried to a separate takeout portion 8.

In this vending machine 1, merchandise carrying mechanisms 6 and 9 operate independently to carry merchandise, respectively. Accordingly, the construction of a plurality of door members and other supporting elements to comprise separate takeout portions 5 and 8 results in an unduly complicated vending machine. In addition, since a user cannot easily know which merchandise is carried to which takeout portions 5 and 8, it is sometimes inconvenient that there is a plurality of takeout portions in a vending machine.

SUMMARY OF THE INVENTION

It is a primary object of this invention to provide a vending machine in which a user can easily take out merchandise.

It is another object of this invention to provide a vending machine having both a conveyor rack and a serpentine rack which uses only one cabinet takeout portion for removing merchandise.

It is another object of this invention to provide a conveyor mechanism under a serpentine rack to facilitate delivery of merchandise from the serpentine rack to the one takeout portion.

A preferred vending machine according to the present invention includes a cabinet, a first merchandise carrying member disposed within the cabinet having a plurality of vertically aligned conveyor racks and a vertically extending elevator disposed within the cabinet and having a movable bucket. The machine also includes a second merchandise carrying member disposed within the cabinet under the plurality of conveyor racks and including at least one serpentine rack. A conveyor mechanism is disposed under the at least one serpentine rack for receiving merchandise from the at least one serpentine rack and for carrying this same merchandise to the bucket of the elevator.

The various advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive manner, in which there is illustrated and described preferred embodiments of the invention.

DETAILED DESCRIPTION OF THE PREFERRED EMBODIMENT

Figure 1:
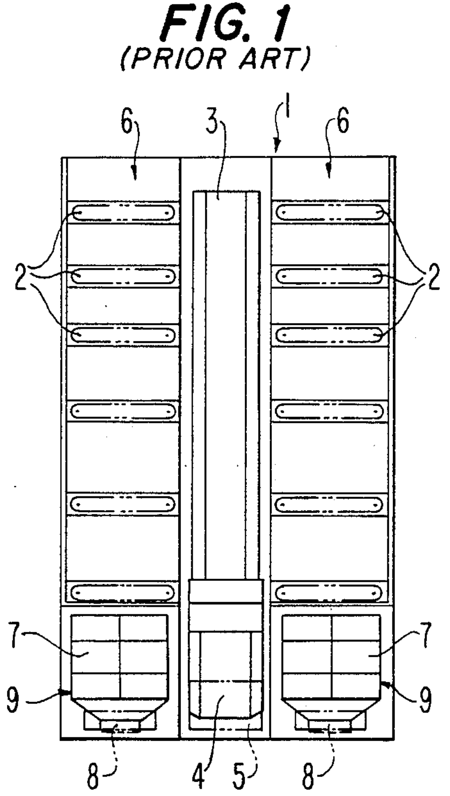
FIG. 1 (PRIOR ART)
FIG. 1 is a schematic view of showing the interior of a conventional vending machine.

The construction of a vending machine in accordance with one embodiment of this invention is shown in FIGS. 2–6.

A vending machine 10 has a cabinet 101, a condensing unit room 11 at the lower end of cabinet 101, a heat insulating door 12 for closing a front opening thereof and an outer door 13 for closing both a front end surface of the heat insulating door 12 and the interior condensing unit room 11. A merchandise takeout portion 14 is formed through the heat insulating door 12 and the outer door 13 at about the center of the outer door 13 to take merchandise out and away from the machine.

Included in the vending machine 10 is a conveyor and an elevator type first merchandise carrying mechanism 20 for carrying mainly relatively large size merchandise. Also included is a serpentine type second merchandise carry mechanism 30 for carrying mainly relatively small size merchandise. In addition, a conveyor mechanism 40 is included for carrying merchandise away from the second merchandise carrying mechanism 20.

The first merchandise carrying mechanism 20 includes an elevator 21 which preferably vertically extends through a center of an interior of the cabinet 101. The first merchandise carrying mechanism also includes a plurality of conveyor racks 22 which are serially disposed on opposite sides of the elevator 21. The elevator 21 vertically moves a bucket 24, which is connected to an endless chain 23, in accordance with the rotational direction of a motor 25.

The position of the movable bucket 24 is always detected by sensors (not shown). This bucket can be stopped at a position corresponding to a conveyor rack 22 or to the merchandise takeout portion 14 so that merchandise A may be carried from a conveyor rack 22 to the merchandise takeout portion 14.

Figure 3:
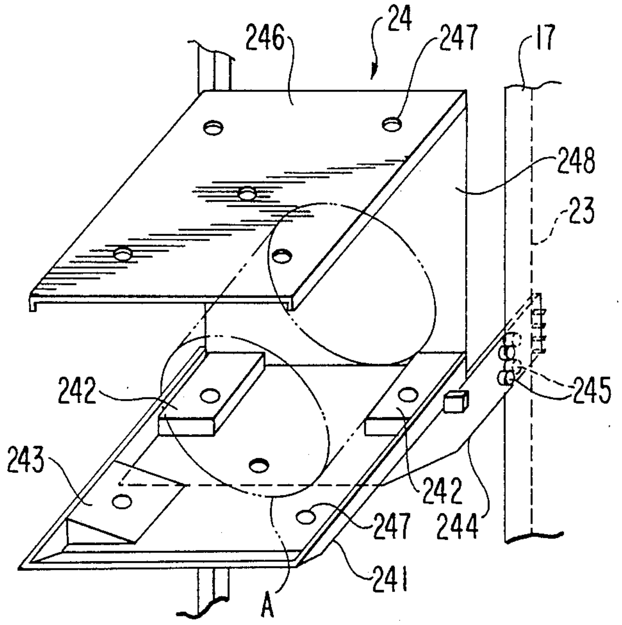
FIG. 3 is an enlarged perspective view of a bucket as in FIG. 2.
Figure 2:
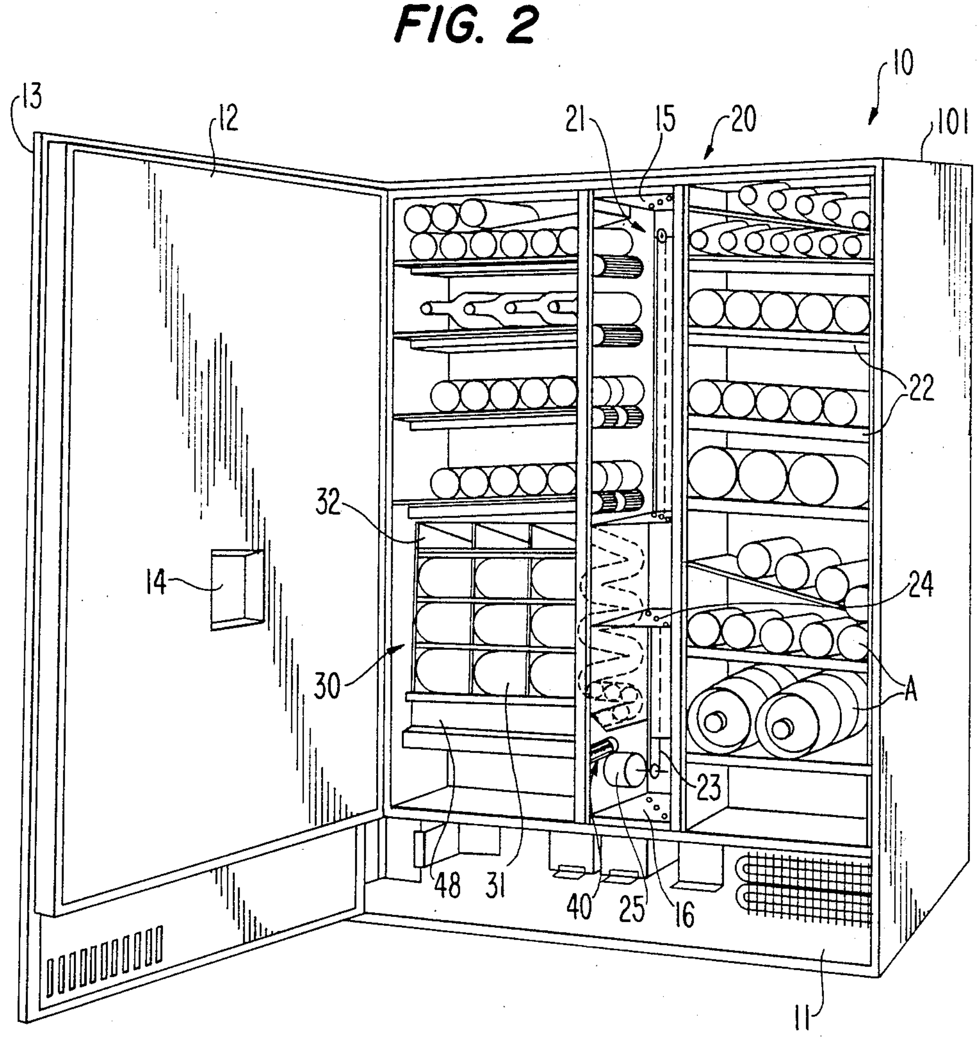
FIG. 2 is a perspective view showing the interior of a vending machine in accordance with one embodiment of this invention.

The movable bucket 24 is assembled in a U-shape as shown in FIG. 3. It includes a lower end plate 241, an upper end plate 246 and a rear end side plate 248 which connects therebetween.

A pair of position determining members 242, each of which is formed in a rectangular shape, are attached on a rear end (adjacent rear end side plate 248) of the lower plate 241 of the bucket 24 to accommodate merchandise A approximately at a center of the lower end plate. A guide member 243, which has an inclined surface, is attached on the front end of lower plate 241 to facilitate a smooth transfer, preferably sliding, of merchandise A from the conveyor mechanism 40 onto the lower end plate 241. Connecting rods 244, which are connected to the endless chain 23, are attached to the bottom end surface of the lower plate 241 of the bucket 24. A guide roller 245 is attached to one end of each connecting rod 244 and is retained within a guide rail 17. This guide rail 17 is vertically extending in the vending machine 10 so that the bucket vertically moves in the vending machine.

A plurality of holes 247 are formed through the upper and lower end plates 246 and 241 of the bucket. The position determining members 242, the guide member 243 and the connecting rods 244 are positioned to respectively correspond to each other so that the light from a luminous sensor portion 15 can pass through the holes 247 to a light receiving portion 16. Accordingly, this light is detected whether merchandise A is accommodated in the bucket 24 or not.

Figure 4:
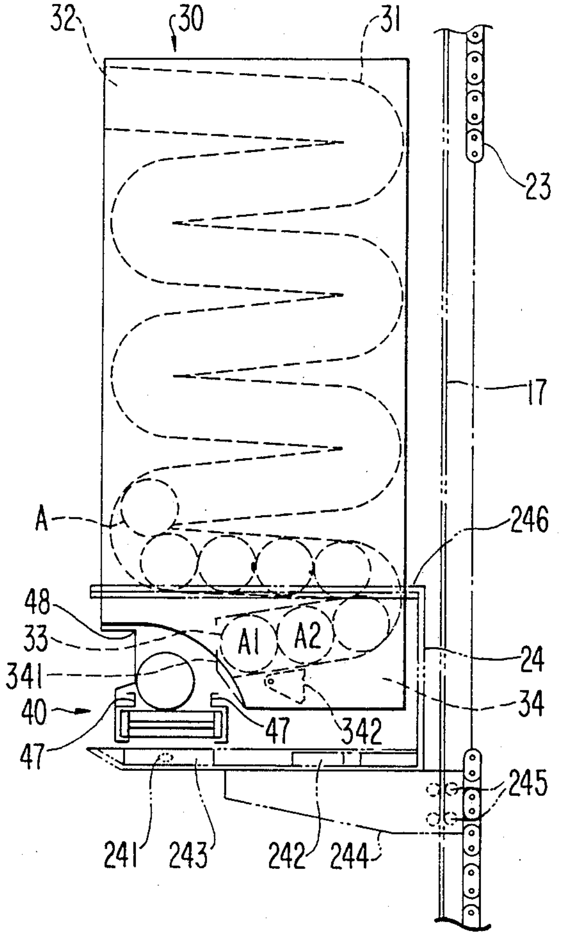
FIG. 4 is a side view of a serpentine rack and a conveyor mechanism as in FIG. 2.

The second merchandise carrying mechanism 30 is disposed under the conveyor rack 22 of the first merchandise carrying mechanism 20 and preferably includes a plurality of serpentine racks 31. Each serpentine rack 31 is formed in a serpentine shape as shown in FIG. 4 and includes an inlet opening 32 at its upper end and an outlet opening 33 at its lower end for carrying merchandise A, respectively. A merchandise control mechanism 34, which includes a first stopper 341 and a second stopper 342, is attached to an outlet opening 33 of a serpentine rack. An upper end portion of the second stopper 342 projects above an upper end surface of the control mechanism 34 to prevent the second merchandise A2 from going down. Thereafter, the first stopper 341, which is projecting above the upper end surface of the control mechanism 34, comes down, so that the first merchandise A1 drops onto the conveyor mechanism 40. The first stopper 341 then comes up to project above the upper end surface of the control mechanism 34 and the second stopper 342 comes down so that the second merchandise A2 passes by the second stopper 342 and is prevented from dropping by the first stopper 341. Thereafter, the above operation of the control mechanism 34 can be repeated whenever merchandise is displaced so that merchandise drops separately (i.e., one by one) onto the conveyor mechanism.

Figure 5:
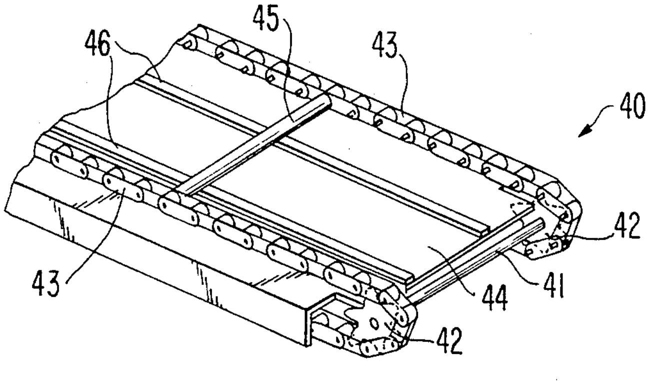
FIG. 5 is a partial enlarged perspective view of the conveyor mechanism as in FIG. 2.

As shown in FIG. 5, the preferred conveyor mechanism 40 is disposed under the outlet opening 33 of the serpentine rack 31 and it at least includes a pair of sprockets 42, a shaft 41 and a pair of chains 43. The sprockets 42 are fixed to both ends of the shaft 41, respectively. The chains 43 are laid on each sprocket 42, respectively. A merchandise receiving plate 44 receives merchandise from a serpentine rack 31. This can either be directly from the serpentine rack or preferably from a merchandise control mechanism 34 at the outlet opening of a serpentine rack. The receiving plate includes guide rails 46 extending along the chains 43 and disposed between the chains 43. A plurality of moving shafts 45 connect between both chains 43. These shafts are disposed to pass by and above a top surface of the guide rails 46 of the receiving plate 44 at regular intervals to move merchandise on the receiving plate 44 toward the bucket 24. Guide plates 47 are disposed at both ends of the chains 43. Each guide plate substantially covers a chain 43 so that these plates help to prevent merchandise from dropping off the merchandise receiving plate 44. A stopper plate 48 is disposed at a side of the conveyor mechanism which is opposite of a side of the conveyor mechanism at which the outlet opening 33 of the serpentine rack 31 is disposed to prevent merchandise, which is possibly dropped from the outlet opening 33, from falling off the receiving plate 44.

Figure 7:
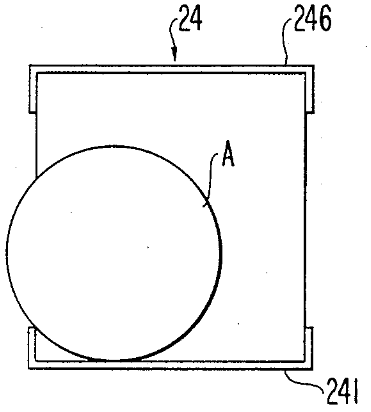
FIGS. 7 and 8 are descriptive views showing states for merchandise which is not certainly accommodated in a bucket.

The operation of the present vending machine is as follows. If merchandise A on one of a plurality of conveyor racks 22 is selected by a user through a merchandise selection switch (not shown), the bucket 24 moves to the position of the conveyor rack 22 corresponding to the selected merchandise A by the driving of the motor 25. The conveyor rack 22 carries this merchandise A to the movable bucket 24. At this time, the merchandise A rolls into the bucket 24 and is accommodated approximately at the center of the bucket 24 by position control members 242 as shown in FIG. 3. These position control members substantially reduce the likelihood of breaking the merchandise. If it were not for these position control members 242, a part of merchandise A might extend outside of the bucket 24 as shown in FIG. 7. This could cause the merchandise A to collide against the conveyor rack 22 or to be put between a bucket 24 and a conveyor rack 22 when the bucket 24 moves upward or downward. In either case, merchandise A would likely be broken.

Figure 6:
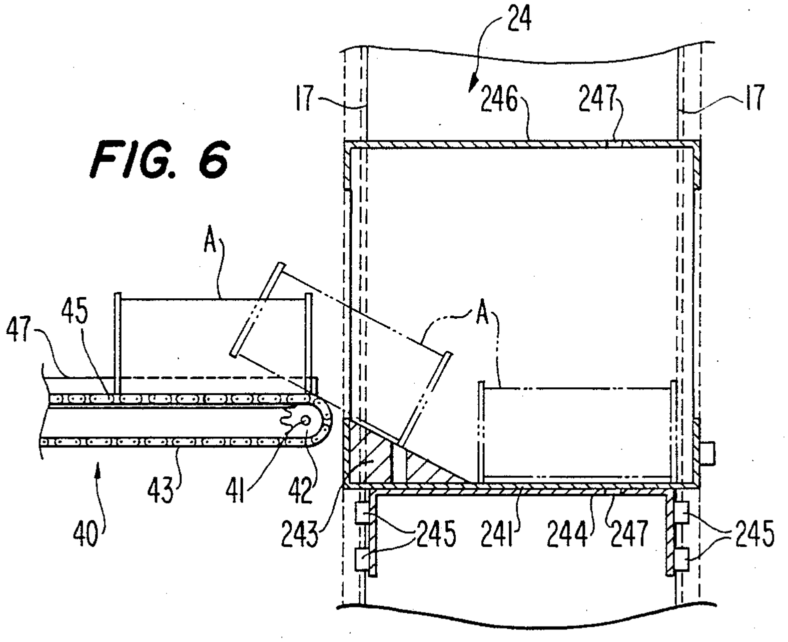
FIG. 6 is a cross-sectional view showing an operational state for the conveyor mechanism in relation to the bucket.
Figure 8:
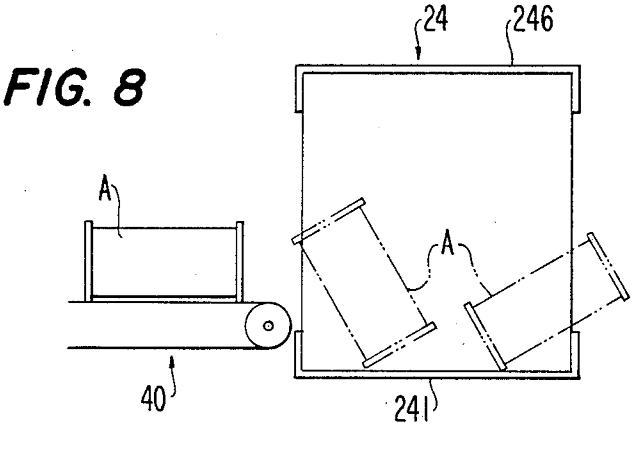

If merchandise A in a serpentine rack 31 is selected by a user through a merchandise selection switch, the bucket 24 moves downward to the height of the conveyor mechanism 40. The merchandise control mechanism 34 of the outlet opening 33 operates to separately (i.e., one by one) displace each merchandise A to the conveyor mechanism 40. The merchandise A can drop onto the merchandise receiving plate 44 of the conveyor mechanism 40 and the merchandise can then be moved to the bucket 24 by the conveyor mechanism moving shaft 45. The merchandise A then can slide on the inclined surface of the guide member 243 to the bucket 24 as shown in FIG. 6. Guide member 243 prevents the merchandise A from falling down when it is moved from the conveyor mechanism 40 to the bucket 24 as shown in FIG. 8 which might cause breakage due to merchandise extending outside the bucket.

This invention has been described in detail in connection with a preferred embodiment, but this embodiment is an example only, and the invention is not restricted thereto. It will be easily understood by those skilled in the art that other variations and modifications can be easily made within the scope of this invention.

We claim:

1. A vending machine comprising:
   - a cabinet having a takeout portion;
   - a conveyor rack, disposed within said cabinet, for storing first merchandise;
   - a serpentine rack, disposed within said cabinet, for storing second merchandise;
   - first means, disposed within said cabinet, for transferring the first merchandise from said conveyor rack to said takeout portion of said cabinet if the user selects the first merchandise; and
   - second means, disposed within said cabinet, for transferring the second merchandise from said serpentine rack to said first transferring means for delivery to said same takeout portion of said cabinet.

2. The vending machine as in claim 1, wherein said second transferring means further comprises a conveyor mechanism disposed under said serpentine rack for receiving the second merchandise from said serpentine rack.

3. A vending machine comprising:

a cabinet having a takeout portion;

a conveyor rack, disposed within said cabinet, for storing first merchandise;

a serpentine rack, disposed within said cabinet, for storing second merchandise; and means, disposed within said cabinet, for transferring the first merchandise from said conveyor rack to said takeout portion of said cabinet if the user selects the first merchandise and for transferring the second merchandise from said serpentine rack to said same takeout portion of said cabinet if the user selects the second merchandise;

wherein said transferring means further comprises a conveyor mechanism disposed under said serpentine rack for receiving the second merchandise from said serpentine rack; and wherein said transferring means further comprises a vertically extending elevator having a movable bucket and said conveyor mechanism carries the second merchandise received from said serpentine rack to said movable bucket of said elevator.

4. The vending machine as in claim 3, wherein said bucket is moved in said elevator to a position corresponding to the selected merchandise by the driving of a motor.

5. A vending machine comprising:

a cabinet having a takeout portion;

a conveyor rack, disposed within said cabinet, for storing first merchandise;

a vertically extending elevator, disposed within said cabinet and having a movable bucket, said bucket disposed to deliver the first merchandise from said conveyor rack to said takeout portion of said cabinet;

a plurality of serpentine racks, disposed within said cabinet, for storing at least a second merchandise, each rack having an outlet opening at its lower end; and means, disposed adjacent each outlet opening of each of said serpentine racks, for conveying at least the second merchandise from one of said plurality of serpentine racks to said movable bucket of said elevator for delivery to said same takeout portion of said cabinet.

6. The vending machine as in claim 5, further comprising a merchandise control mechanism attached to said outlet opening of at least one of said serpentine racks for controlling transfer of merchandise separately onto said merchandise conveying means.

7. The vending machine as in claim 5, wherein said conveyor rack further comprises a plurality of vertically aligned conveyor racks and said elevator and movable bucket are disposed to deliver merchandise from any one of said plurality of conveyor racks to said takeout portion of said cabinet.

8. The vending machine as in claim 5, wherein said plurality of serpentine racks are disposed under said conveyor rack.

9. The vending machine as in claim 5, wherein said movable bucket further comprises upper and lower end plates and a rear end side plate and said vending machine further comprises an inclined guide member mounted on said lower end plate for guiding merchandise from said merchandise conveying means to a desired location in said movable bucket.

10. The vending machine as in claim 9, wherein said vending machine further comprises a pair of position determining members mounted on said movable bucket lower end plate for accommodating merchandise approximately at a center of said lower end plate.

11. The vending machine as in claim 5, wherein said merchandise conveying means further comprises:

a merchandise receiving plate having guide rails; and a plurality of moving shafts disposed above said guide rails of said receiving plate to move merchandise on said receiving plate to said movable bucket.

12. The vending machine as in claim 11, wherein said merchandise conveying means further comprises:

at least one shaft;

at least a pair of sprockets fixed to both ends of said shaft; and a pair of chains, each chain disposed on one of said sprockets, said pair of chains having said plurality of moving shafts connected between them and said guide rails disposed between them.

13. The vending machine as in claim 12, wherein said merchandise conveying means further comprises a pair of guide plates, each plate disposed to substantially cover one of said chains.

14. The vending machine as in claim 12, wherein said merchandise conveying means further comprises a stopper plate disposed at a side of said conveying means which is opposite a side of said conveying means at which said outlet openings of said serpentine racks are disposed.

15. The vending machine as in claim 5, wherein said cabinet includes only one takeout portion.

16. A vending machine comprising:

a cabinet having a takeout portion;

a plurality of vertically aligned conveyor racks, disposed within said cabinet, for storing at least a first merchandise;

a vertically extending elevator, disposed within said cabinet and having a movable bucket, said bucket disposed to deliver at least the first merchandise from at least one of said conveyor racks to said takeout portion of said cabinet;

a plurality of serpentine racks, disposed within said cabinet, for storing at least a second merchandise, each rack having an outlet opening at its lower end; and means, disposed adjacent each outlet opening of each of said serpentine racks, for conveying at least said second merchandise from one of said plurality of serpentine racks to said movable bucket of said elevator for delivery to said same takeout portion of said cabinet.

17. The vending machine as in claim 16, wherein said movable bucket further comprises upper and lower end plates and a rear end side plate and said vending machine further comprises an inclined guide member mounted on said lower end plate for guiding merchandise from said merchandise conveyor mechanism to a desired location in said movable bucket.

18. The vending machine as in claim 16, wherein said conveying mechanism further comprises:

a merchandise receiving plate having guide rails; and a plurality of moving shafts disposed above said guide rails of said receiving plate to move merchandise on said receiving plate to said movable bucket.

19. The vending machine as in claim 16, wherein said elevator vertically extends through a center of an interior of said cabinet and said cabinet includes only one takeout portion aligned with said elevator.

20. The vending machine as in claim 19, wherein said plurality of conveyor racks are serially disposed on opposite sides of said elevator.

* * * * *